(12) United States Patent
Valentine et al.

(10) Patent No.: US 8,375,848 B2
(45) Date of Patent: Feb. 19, 2013

(54) SELF-CLEANING ROTISSERIE OVEN

(75) Inventors: Richard D. Valentine, Hillsboro, OH (US); Nigel G. Mills, Kettering, OH (US); Matthew A. Weber, Springboro, OH (US); James M. Heiser, Hillsboro, OH (US); Clifford A. Blackmore, Troy, OH (US)

(73) Assignee: Premark FEG L.L.C., Glenview, IL (US)

( * ) Notice: Subject to any disclaimer, the term of this patent is extended or adjusted under 35 U.S.C. 154(b) by 586 days.

(21) Appl. No.: 12/323,909

(22) Filed: Nov. 26, 2008

(65) Prior Publication Data

US 2009/0178576 A1    Jul. 16, 2009

Related U.S. Application Data

(60) Provisional application No. 61/021,108, filed on Jan. 15, 2008.

(51) Int. Cl.
*A47J 37/07* (2006.01)

(52) U.S. Cl. .................................... 99/421 H

(58) Field of Classification Search ............ 99/421 HH, 99/421 H, 419, 421 R; 126/21 A, 19 R, 1 R; 219/400; 134/24, 172, 111, 58 DL
See application file for complete search history.

(56) References Cited

U.S. PATENT DOCUMENTS

| | | | | |
|---|---|---|---|---|
| 1,675,192 A | * | 6/1928 | Murdoch | 134/176 |
| 1,823,583 A | * | 9/1931 | Biskamp | 134/177 |
| 2,017,663 A | | 10/1935 | Lahn | |
| 2,995,143 A | * | 8/1961 | Strathearn et al. | 137/387 |
| 3,091,953 A | * | 6/1963 | Hubbard | 68/12.21 |
| 3,133,433 A | * | 5/1964 | Gebel | 68/12.05 |
| 3,261,554 A | | 7/1966 | Perl | |
| 3,333,531 A | | 8/1967 | Reuther | |
| 3,373,754 A | | 3/1968 | Squire | |
| 3,490,486 A | * | 1/1970 | Cushing | 137/387 |

(Continued)

FOREIGN PATENT DOCUMENTS

| DE | 2006622 | 8/1971 |
|---|---|---|
| DE | 2842771 | 4/1980 |

(Continued)

OTHER PUBLICATIONS

Abstract—*DE 2842771*—Lechmetall Landsberg GMBH, Vorrichtung Und Verfahren Zur Waermebehandlung Von Mahrungsmitteln, Insbesondere Zur Zubereitung Von Speissen, publication date: Apr. 10, 1980.

(Continued)

*Primary Examiner* — Gene Kim
*Assistant Examiner* — M Chambers
(74) *Attorney, Agent, or Firm* — Thompson Hine LLP

(57) ABSTRACT

A self-cleaning rotisserie oven includes a cooking chamber for cooking food product. A rotor is used for supporting and moving a food product in the cooking chamber. A sump is positioned below the cooking chamber that collects water provided to the cooking chamber. A sensor is positioned to detect when the sump is filled to a set level. An inlet valve is configured to control supply of water to the cooking chamber. A controller is configured to carry out a self-cleaning process. The self-cleaning process includes (a) a pre-rinse phase where the controller (i) opens the inlet valve, (ii) closes the inlet valve when the sensor detects that the sump is filled to the set level, and (iii) determines a duration of time that the inlet valve was open during (i), and (b) a later phase during which the controller opens the inlet valve for an amount of time based on the duration of time determined during (a)(iii).

16 Claims, 5 Drawing Sheets

U.S. PATENT DOCUMENTS

| | | | |
|---|---|---|---|
| 3,550,576 | A | 12/1970 | Saver |
| 3,698,377 | A | 10/1972 | Smith |
| 3,854,762 | A | 12/1974 | Spiegel et al. |
| 3,951,683 | A | 4/1976 | Jarvis et al. |
| 3,951,684 | A * | 4/1976 | LaPrad et al. ................ 134/144 |
| 3,986,891 | A * | 10/1976 | Rumbaugh ................ 134/58 D |
| 4,353,559 | A | 10/1982 | Budzich et al. |
| 4,380,248 | A * | 4/1983 | Ambrus et al. ............... 137/428 |
| 4,438,685 | A | 3/1984 | Haas, Sr. et al. |
| 4,442,143 | A | 4/1984 | Reed |
| 4,620,490 | A | 11/1986 | Brady et al. |
| 4,646,713 | A | 3/1987 | Honigsbaum |
| 4,741,809 | A | 5/1988 | Becker et al. |
| 4,800,824 | A | 1/1989 | DiFonzo |
| 4,869,428 | A * | 9/1989 | Gombar ........................ 239/261 |
| 4,998,550 | A | 3/1991 | Archambault |
| 5,085,443 | A | 2/1992 | Richards |
| 5,137,041 | A * | 8/1992 | Hall ............................. 134/57 D |
| 5,191,831 | A | 3/1993 | Walden |
| 5,201,682 | A | 4/1993 | Nakagawa et al. |
| 5,377,784 | A | 1/1995 | Walkowiak et al. |
| 5,427,129 | A | 6/1995 | Young, Jr. et al. |
| 5,451,744 | A * | 9/1995 | Koopman et al. ............. 219/400 |
| 5,485,780 | A | 1/1996 | Koether et al. |
| 5,499,577 | A | 3/1996 | Tommasini |
| 5,560,694 | A | 10/1996 | Banicevic et al. |
| 5,678,430 | A | 10/1997 | Merlin et al. |
| 5,704,278 | A | 1/1998 | Cross |
| 5,746,233 | A * | 5/1998 | Kuroda et al. ............... 134/57 R |
| 5,765,838 | A | 6/1998 | Ueda et al. |
| 6,131,559 | A | 10/2000 | Norris et al. |
| 6,182,561 | B1 | 2/2001 | Garner et al. |
| 6,205,913 | B1 | 3/2001 | Zittel et al. |
| 6,318,245 | B1 | 11/2001 | Durth et al. |
| 6,330,855 | B2 | 12/2001 | Backus et al. |
| 6,405,738 | B1 | 6/2002 | Clark et al. |
| 6,410,890 | B1 | 6/2002 | Kohlstrung |
| 6,478,034 | B1 | 11/2002 | Durth et al. |
| 6,595,112 | B2 * | 7/2003 | Durth ............................... 99/330 |
| 6,622,754 | B1 * | 9/2003 | Roth et al. ....................... 134/18 |
| 6,626,190 | B2 * | 9/2003 | Durth et al. ................ 134/22.18 |
| 6,772,751 | B2 | 8/2004 | Deuringer et al. |
| 6,904,904 | B2 | 6/2005 | Walther et al. |
| 6,918,398 | B2 | 7/2005 | Edelmann et al. |
| 7,060,942 | B2 | 6/2006 | Friedl et al. |
| 7,157,668 | B2 | 1/2007 | Bartelick |
| 2003/0000515 | A1 | 1/2003 | Cole et al. |
| 2003/0070799 | A1 | 4/2003 | Mueller et al. |
| 2004/0055477 | A1 | 3/2004 | Swank et al. |
| 2004/0098292 | A1 | 5/2004 | Miller et al. |
| 2004/0142082 | A1 | 7/2004 | Friedl et al. |
| 2004/0163635 | A1 | 8/2004 | Thorneywork |
| 2005/0006436 | A1 | 1/2005 | Jordens et al. |
| 2005/0022314 | A1 * | 2/2005 | Ambuter et al. ................... 8/158 |
| 2005/0022676 | A1 | 2/2005 | Swank et al. |
| 2005/0076900 | A1 | 4/2005 | Walther et al. |
| 2005/0155498 | A1 | 7/2005 | Killion |
| 2005/0199616 | A1 | 9/2005 | Stahli |
| 2006/0054155 | A1 | 3/2006 | Bujeau et al. |
| 2006/0081593 | A1 | 4/2006 | Benoit et al. |
| 2006/0124627 | A1 | 6/2006 | Friedl et al. |
| 2006/0179583 | A1 * | 8/2006 | Ambuter et al. ................... 8/158 |
| 2006/0196495 | A1 | 9/2006 | Kim et al. |
| 2006/0237425 | A1 | 10/2006 | Kim et al. |
| 2006/0284064 | A1 | 12/2006 | Liu et al. |
| 2007/0272682 | A1 | 11/2007 | Chin |
| 2008/0223357 | A1 * | 9/2008 | Bartelick et al. ............. 126/21 A |
| 2008/0280040 | A1 | 11/2008 | Barrall et al. |

FOREIGN PATENT DOCUMENTS

| | | |
|---|---|---|
| DE | 3114951 | 11/1982 |
| DE | 3820572 | 12/1989 |
| DE | 4007198 | 10/1991 |
| DE | 19950920 | 5/2001 |
| DE | 10156419 | 6/2003 |
| DE | 102004006973 | 10/2004 |
| DE | 102006010460 | 9/2007 |
| EP | 0310741 | 4/1989 |
| EP | 0401173 | 12/1990 |
| EP | 0532393 | 3/1993 |
| EP | 0652405 | 5/1995 |
| EP | 0786630 | 7/1997 |
| WO | 2005/024308 | 3/2005 |

OTHER PUBLICATIONS

PCT, International Search Report and Written Opinion, International Application No. PCT/US2009/030243, 14 pages (Mar. 9, 2010).

Non-Final Office Action, mailed Oct. 7, 2010; U.S. Appl. No. 12/324,333; USPTO; 13 pages.

PCT, International Preliminary Report on Patentability, International Application No. PCT/US2009/030243 (Jul. 29, 2010).

* cited by examiner

SELF-CLEANING ROTISSERIE OVEN

CROSS REFERENCE TO RELATED APPLICATIONS

This application claims the benefit of U.S. Application No. 61/021,108, filed Jan. 15, 2008, and herein incorporated by reference.

TECHNICAL FIELD

This application relates generally to ovens used for cooking food product and, more specifically, to a rotisserie oven with an integrated cleaning system and process.

BACKGROUND

Various types of ovens are used for cooking food product. Rotisserie ovens are commonly used in the retail environment to cook chickens and other food products in a manner that permits store customers to view the food product during cooking. Rotisserie style cooking tends to result in grease, juices and food particles within the oven that require the oven to be cleaned regularly. It would be desirable to provide a rotisserie oven with an integrated self-cleaning system.

SUMMARY

In one aspect, a self-cleaning rotisserie oven includes a rotatable spray arm from which liquid is sprayed during cleaning. A cleaning process includes an initial fill and purge to remove fats, oils, and food particles. The initial fill is performed through the spray arm. Other sump fill stages may also be achieved through the spray arm.

In another aspect, a self-cleaning rotisserie oven includes an initial sump fill to a sensed level. The oven controller records the amount of time required to achieve the initial sump fill. During one or more subsequent sump fill operations of the cleaning process, the recorded fill time is used to control the flow of water into the machine.

In another aspect, a self-cleaning rotisserie oven includes a cooking chamber for cooking food product. A rotor is used for supporting and moving a food product in the cooking chamber. A sump is positioned below the cooking chamber that collects water provided to the cooking chamber. A sensor is positioned to detect when the sump is filled to a set level. An inlet valve is configured to control supply of water to the cooking chamber. A controller is configured to carry out a self-cleaning process. The self-cleaning process includes (a) a pre-rinse phase where the controller (i) opens the inlet valve, (ii) closes the inlet valve when the sensor detects that the sump is filled to the set level, and (iii) determines a duration of time that the inlet valve was open during (i), and (b) a later phase during which the controller opens the inlet valve for an amount of time based on the duration of time determined during (a)(iii).

In another aspect, a self-cleaning rotisserie oven includes a cooking chamber for cooking food product. A rotor is provided for supporting and moving a food product in the cooking chamber. A sump is positioned below the cooking chamber. The sump includes an outlet for draining water from the sump. A rotatable spray arm is located above the sump and is configured to spray the cooking chamber with water until the sump is filled to a set level. The rotatable spray arm is connected to a building water source for receiving water from the building water source to fill the sump to the set level.

In another aspect, a method for electronically controlling a self-cleaning operation of a rotisserie oven including a rotor is provided. The method includes filling a sump located beneath a cooking chamber of the rotisserie oven by delivering water from a building water source to a spray arm located above the sump. The spray arm sprays the cooking chamber with water until the sump is filled to a set level. An amount of time is determined for filling the sump to the set level. The sump is again filled by delivering water from the building source to the spray arm for the amount of time after the sump has been drained.

DETAILED DESCRIPTION

Figure 1:
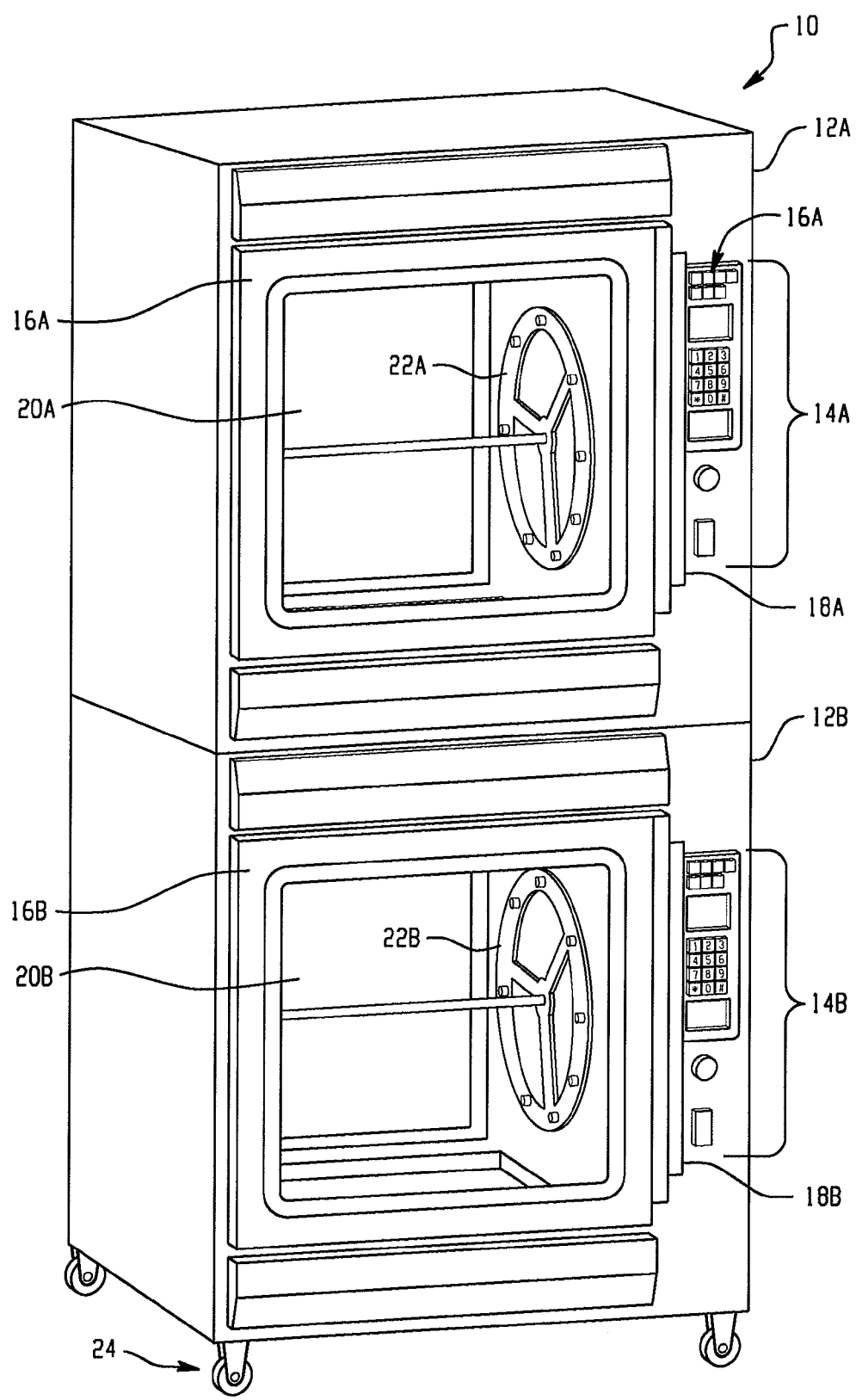
FIG. 1 is a front perspective of a rotisserie system.
Figure 2:
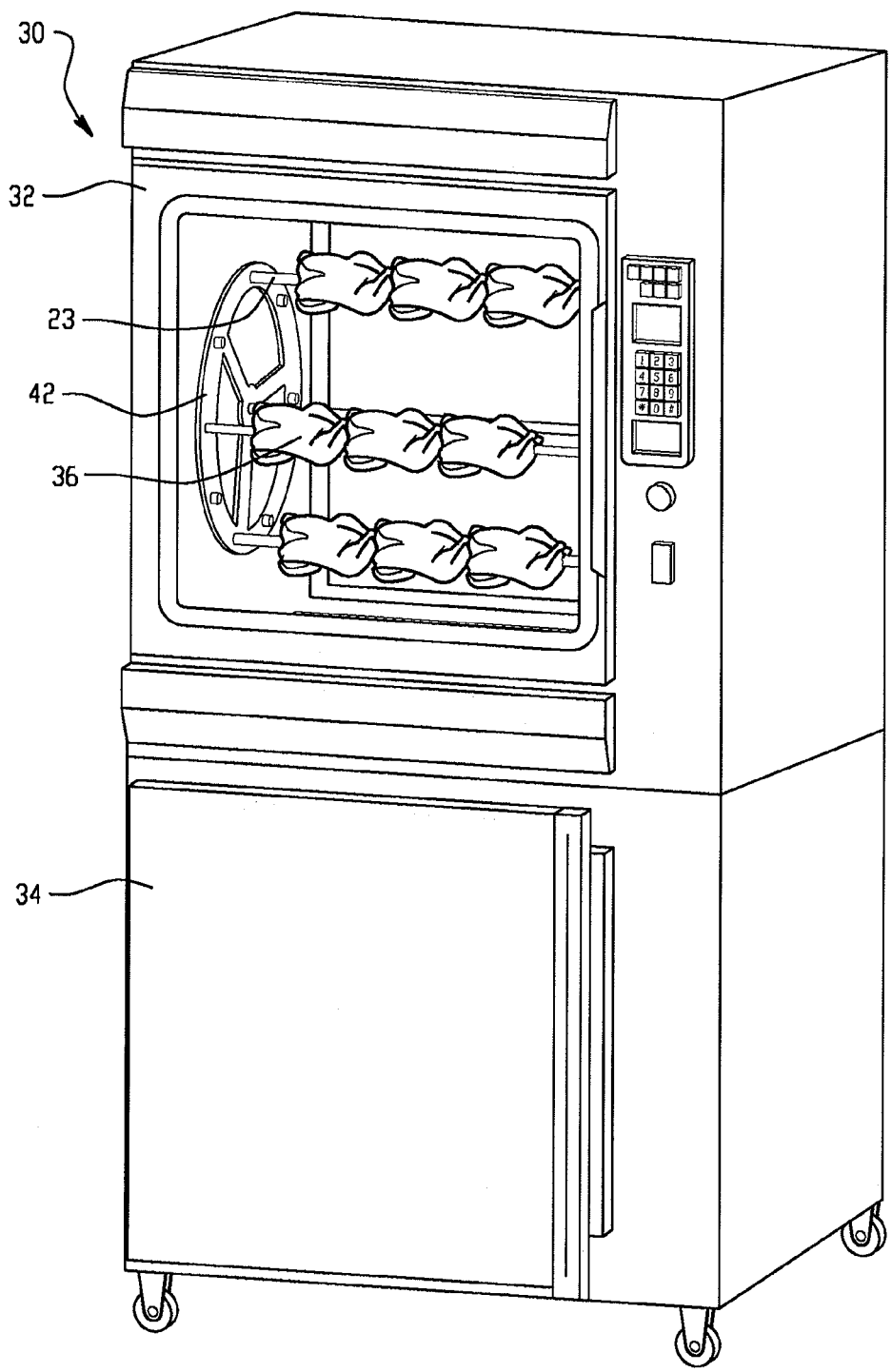
FIG. 2 is a front perspective of another embodiment of a rotisserie system.

Referring to FIG. 1, a rotisserie system 10 is shown including a rotisserie oven 12A stacked atop another rotisserie oven 12B. Each oven includes a respective control interface 14A, 14B, which may include a variety of components, such as an information display area, a numeric keypad, ON/OFF buttons/keys, function specific buttons/keys, and/or various indicator lights. Each oven includes a vertically hinged access door 16A, 16B with a respective handle 18A, 18B and glass front 20A, 20B for viewing the rotisserie operation. The rear side of the oven may also include a viewing window, and in some cases may be formed by a rear door. A rotor 22A, 22B within each oven is also shown. The rotor 22A and 22B rotates a spit 23 that carries food products, such as chickens during cooking (see FIG. 2). The illustrated system is supported by wheels 24 for ease in repositioning the system, with one or more of the wheels 24 including a lock feature. Referring to FIG. 2, a rotisserie system 30 is shown with a single oven 32 stacked atop a lower cabinet 34. The rotor 42 within oven 32 includes birds 36 loaded thereon as per a typical rotisserie cooking operation.

Figure 3:
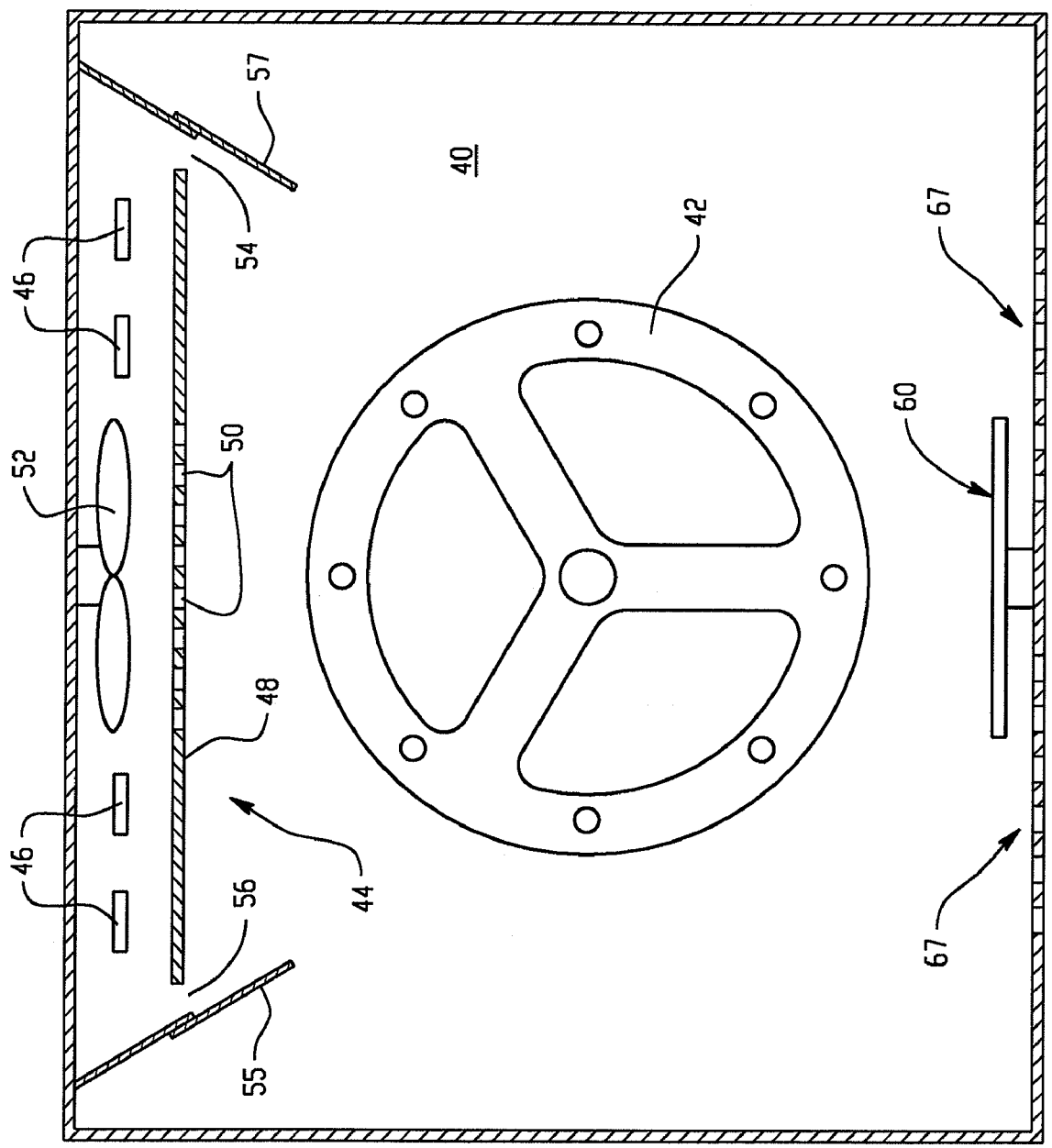
FIG. 3 is a schematic side view of one embodiment of a cooking chamber.

FIG. 3 is a side view layout showing an exemplary oven chamber 40. During rotisserie cooking operations, the rotor 42 rotates as heat is generated by a heating system 44. In the illustrated embodiment, the heating system 44 is formed by heating elements 46 located above an upper plate or shield 48. The plate 48 includes one or more intake openings 50 with associated convection fans 52 arranged to draw air into the openings 50 from the chamber 40. The fans 52 push the air forward and rearward and across the heating elements 46 to pick up heat. The heated air is then directed back into the chamber 40 at forward and rearward slots 54 and 56. Baffles 55 and 57 guide the air inward toward the rotor 42 at the center of the chamber 40 as the heated air passes through the ventilation slots 54 and 56. The space above the plate 48 may include other directional plates or baffles to more effectively produce the forward and rearward air flow.

The rotisserie oven includes a self-cleaning feature that enables the oven to be cleaned during a self-cleaning mode of operation. For this purpose, the oven may generally have hook-ups to a source of water and cleaning agent, and may also include a drain path and hook-up to enable the cleaning water to be purged during various points of the cleaning operation. The cleaning operation may include one or more stages, including pre-wash, wash and/or rinse stages. Different cleaning modes (e.g., which may provide different levels of cleaning) may be provided for user selection based upon the user's observation of how clean or dirty the oven is prior to cleaning.

Figure 4:
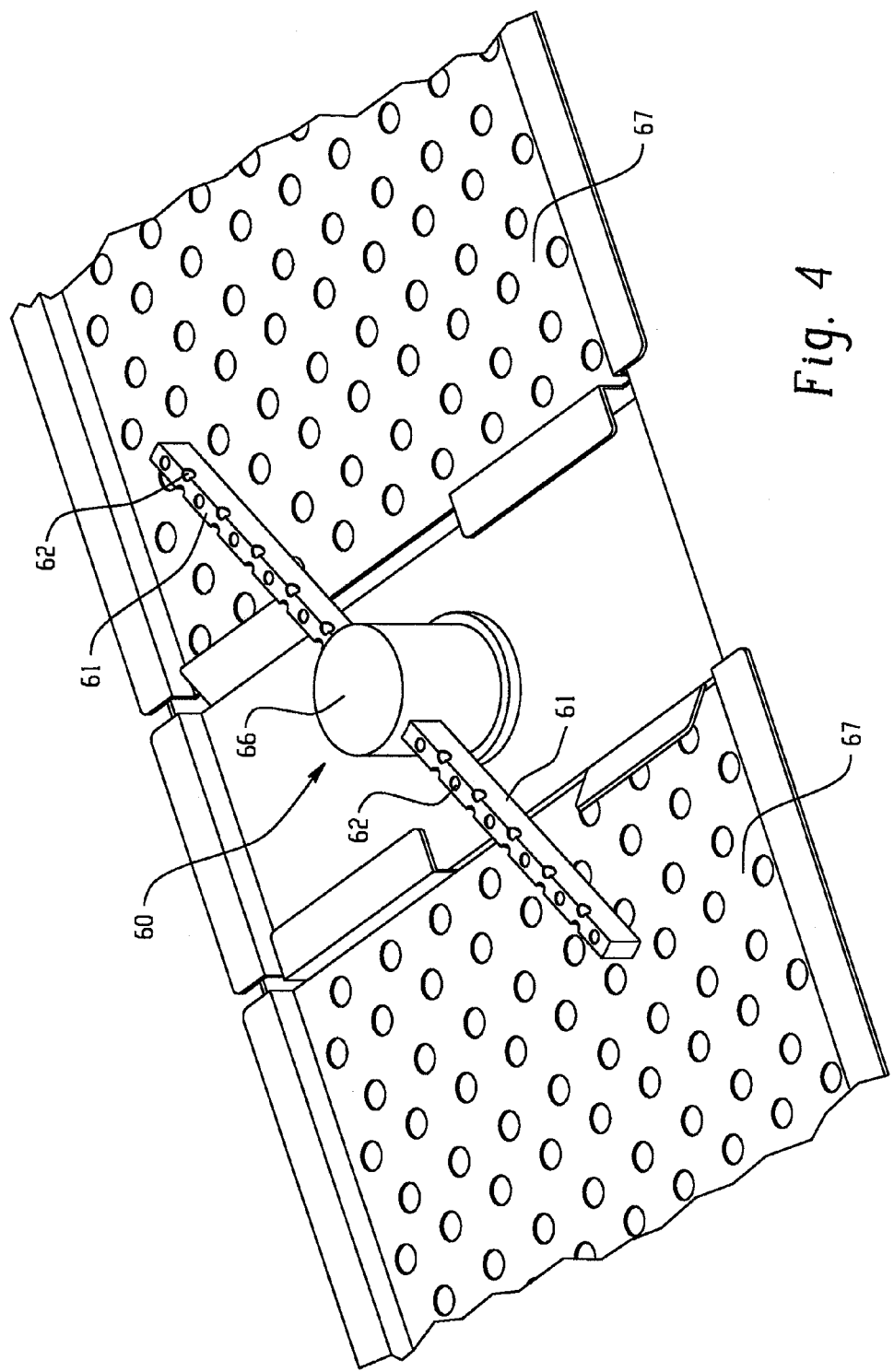
FIG. 4 shows a floor of a cooking chamber including a spray arm assembly and drain manifolds.

In one implementation the self-cleaning feature includes the use of a spray arm assembly 60, shown in FIG. 3 at a bottom portion of the cooking chamber 40. As shown in FIG. 4, the spray arm assembly 60 includes a rotatable spray arm hub 66 upon which is mounted one or more spray arms 61. Each spray arm 61 includes a multiplicity of nozzle openings 62 for ejecting sprays of water during cleaning, and the force of the ejected water urges each arm 61 to rotate. Water is evacuated from the bottom of the chamber 40 through use of the strainers 67, which lead to a lower sump area where cleaning liquid collects for recirculation via a pump. Other stationary and/or rotating wash arms and/or nozzles could also be located elsewhere within the oven chamber 40 and/or above the plate 48.

Figure 5:
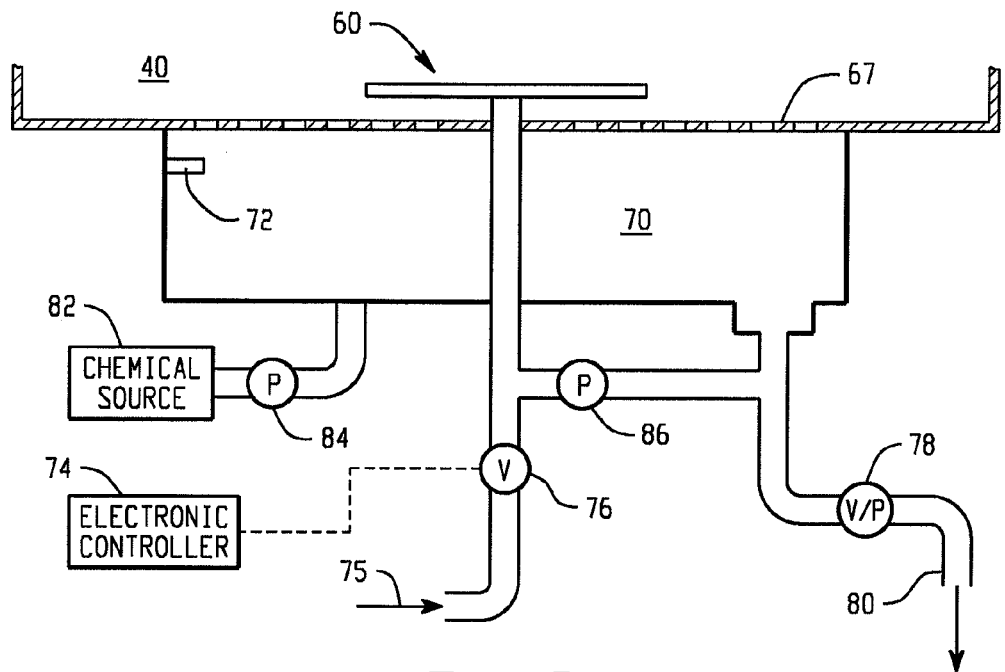
FIG. 5 shows a schematic of one embodiment of a self-cleaning oven.
Figure 6:
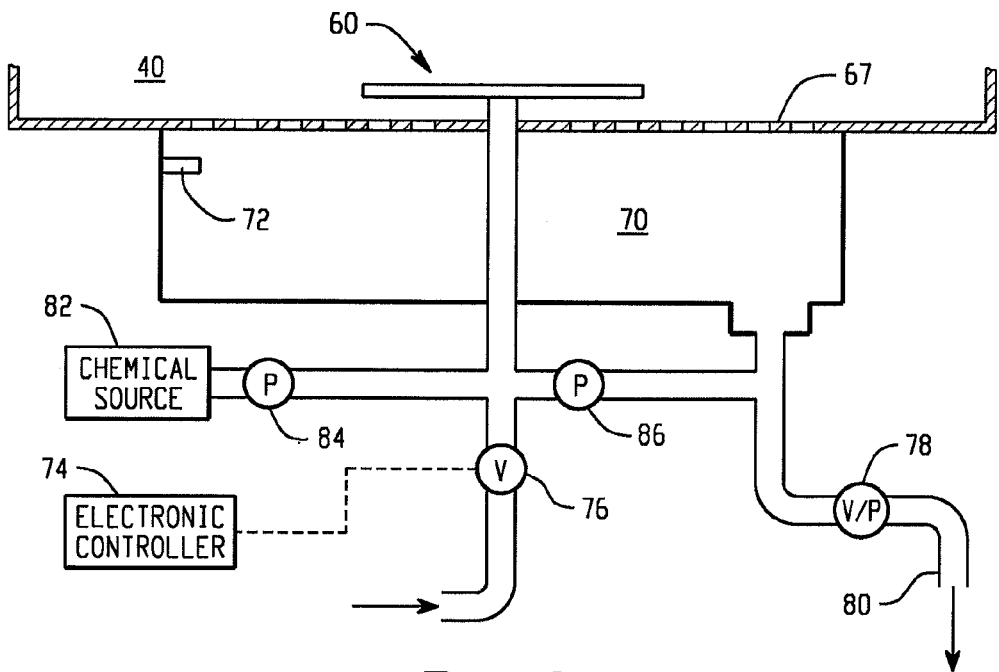
FIG. 6 shows a schematic of another embodiment of a self-cleaning oven.

Referring to FIGS. 5 and 6, in one embodiment, the oven includes a sump area 70 at the bottom of the oven, separated from the oven chamber 40 by the strainers 67. An electronic water level sensor 72 senses ground through the water inside the sump 70. During the cleaning process, a significant amount of foam may be created and float on top of the water in the sump 70. The foam can act as a bridge between the sensor 72 and the actual water level of the sump 70. If the sensor 72 prematurely signals the sump 70 as full and the sump 70 does not fill completely with water, the machine may not clean properly.

In one embodiment, there are a three or more phases in the oven cleaning process. They are pre-rinse, wash, and post-rinse. A software control program (e.g., part of an electronic controller 74) determines and records the amount of time it takes to fill the sump (e.g., through a valve 76 associated with an on-site water hook-up for delivering water from a building or other water source represented by arrow 75) with water to the desired water level indicated by the sensor 72 during the pre-rinse. During the pre-rinse, the sump 70 is devoid of foam. This "fill time" is later used for the remaining wash and post-rinse cycles to fill the sump 70 to the desired level. Specifically, after the pre-rinse stage, water is purged from the sump 70 via a valve or pump 78 associated with the drain line 80. The valve 76 is again opened to fill the sump 70 for the wash phase. However, rather than relying on sensor 72 to determine when to close the valve 76, the controller 74 maintains the valve 76 in open position for the recorded fill time determined during the pre-rinse sump fill. Wash chemicals (e.g., detergent) from a chemical source 82 can also be added to the sump 70 during the sump fill via control of chemical pump 84, which in one example is a peristaltic pump. The chemicals can fill directly into the sump 70, as illustrated by the embodiment of FIG. 5. Alternatively, wash chemicals could be plumbed to combine with the source water before entering the sump 70, as illustrated by the alternate embodiment of FIG. 6. After the wash phase, the sump 70 is again purged and can then be filled again, using the recorded fill time, for the post-rinse phase.

During each phase, after the sump 70 is filled to the desired level, the recirculating pump 86 is typically operated for a programmed period of time before purging the sump 70 in preparation for the next phase. However, during cooking, liquids (e.g., oils and fats) and particulates tend to collect in the sump area. It may be desirable as an initial phase to simply fill and drain the sump 70, without operating the recirculating pump 86, in order to get an initial load of oils, greases and particulates out of the oven without attempting to pass them through the pump 86.

Filling the sump 70 in this method ensures that the sump is sufficiently full of water and capable of cleaning the entire machine regardless of the amount of foam which may have been created. The process may recalibrate the fill time at the start of every cleaning cycle, accounting for variance in water pressure and volume for any field installation regardless of elevation or location and without the use of any extra equipment or parts.

As reflected in the schematic of FIGS. 5 and 6, the sump fill process is achieved through the spray arm 60 rather than feeding the water directly into the sump 70. The water therefore comes from above any foam (including oils and grease from cooking) that may be present at the bottom of the oven 32. The action of the fill from above, in combination with the mechanical action of the spray arm, tends to knock down foam and reduce foam-based cavitation during operation of the recirculating pump 86, providing better water flow and a more effective rinse during the cleaning process.

It is to be clearly understood that the above description is intended by way of illustration and example only, is not intended to be taken by way of limitation. For example, the rotisserie oven can be stacked as shown in FIG. 1, located on a stand as shown by FIG. 2, located atop a counter, located atop a combination oven, located atop a convection oven, etc. In some embodiments, the rotor 42 may rotate baskets that hold the food product instead of spits. Accordingly, other changes and modifications are possible.

What is claimed is:

1. A self-cleaning rotisserie oven, comprising:
   a cooking chamber for cooking food product;
   a rotor for use in supporting and moving a food product in the cooking chamber;
   a sump positioned below the cooking chamber that collects water provided to the cooking chamber;
   a sensor positioned to detect when the sump is filled to a set level;
   an inlet valve configured to control supply of water to the cooking chamber; and
   a controller configured to carry out a self-cleaning process, the self-cleaning process including:
   (a) a pre-rinse phase in which (i) the controller opens the inlet valve, (ii) the controller closes the inlet valve when the sensor detects that the sump is filled to the set level, and (iii) the controller determines a duration of time between opening of the inlet valve in step (a)(i) and closing of the inlet valve in step (a)(ii), and
   (b) a later phase during which the controller opens the inlet valve for an amount of time that is determined and set by the controller as a function of the duration of time determined by the controller during step (a)(iii), the later phase occurring after the sump has been drained of water delivered in step (a).

2. The self-cleaning rotisserie oven of claim 1 further comprising a recirculating pump and a spray arm located in the cooking chamber, the controller configured to operate the recirculating pump during the later phase to provide water to the spray arm.

3. The self-cleaning rotisserie oven of claim 2, wherein the controller is configured to operate such that water used to fill the sump during step (a) is drained from the sump through a drain line and is not recirculated.

4. The self-cleaning rotisserie oven of claim 2 further comprising a chemical source and a chemical pump, wherein the controller is configured such that during the self-cleaning process the controller operates the chemical pump to add detergent to the sump from the chemical source while the sump is filling with water during step (b), and operates the recirculating pump to recirculate the water with detergent so added.

5. The self-cleaning rotisserie oven of claim 1, wherein the controller is configured such that during the self-cleaning process the controller:
prior to the pre-rinse phase, opens the inlet valve for an initial phase wherein the sump is filled with water, the water from the initial phase not being recirculated in any subsequent phase;
after the pre-rinse phase, opens the inlet valve for a wash phase where the sump is filled, the water from the wash phase including detergent; and
after the wash phase, opens the inlet valve for a post-rinse phase where the sump is filled; and
wherein one of the wash phase or the post-rinse phase is the later phase.

6. The self-cleaning rotisserie oven of claim 5, wherein both the wash phase and the post-rinse phase of the self-cleaning process carried out by the controller include opening the inlet valve for a duration of time dependent on the duration determined in step (a)(iii).

7. The self-cleaning rotisserie oven of claim 1 further including a rotating spray arm located within the cooking chamber above the sump, wherein water is provided to the cooking chamber through the spray action of the rotating arm in order to fill the sump when the inlet valve is open.

8. The self-cleaning rotisserie oven of claim 1, wherein the sensor is an electronic water level sensor.

9. The self-cleaning rotisserie oven of claim 1, wherein the amount of time that the inlet valve is open during step (b) is the same as the duration determined in step (a)(iii).

10. The self-cleaning rotisserie oven of claim 1, wherein during step (b) the controller closes the inlet valve during the later phase once it is true that
the sensor indicates that the sump is full, and that
the amount of time since opening the valve is at least the duration determined in step (a)(iii).

11. A self-cleaning oven, comprising:
a cooking chamber for cooking food product;
a sump positioned below the cooking chamber that collects water provided to the cooking chamber;
a sensor positioned to detect when the sump is filled to a set fill level;
an inlet valve configured to control supply of water to the cooking chamber; and
a controller connected to control the inlet valve and configured to establish a sump fill time for a self-cleaning operation as follows:
(a) the controller (i) opens the inlet valve, (ii) closes the inlet valve when the sensor indicates that the sump is filled to the set fill level, (iii) determines a duration of time between opening of the inlet valve in step (a)(i) and closing of the inlet valve in step (a)(ii) and (iv) determines the sump fill time as a function of the duration of time determined in step (a)(iii) such that variance in the duration of time determined in step (a)(iii) results in variance in the sump fill time, and
(b) during a phase of the self-cleaning operation the controller opens the inlet valve for the sump fill time regardless of an earlier indication by the sensor that the sump is filled to the set level, the phase occurring after the sump has been drained of water delivered in steps (a)(i) and (a)(ii).

12. A method for electronically controlling a self-cleaning oven operation, the method comprising:
(1) utilizing an oven including a cooking chamber, a sump positioned below the cooking chamber and a sump fill control system including a water source and a spray arm located above the sump to carry out the steps of
(a) filling the sump by delivering water from the water source to the spray arm, the spray arm spraying the cooking chamber with water until the sump is filled to a set level;
(b) determining an amount of time for filling the sump to the set level in step (a) and defining a sump fill time as a function of the determined amount of time such that variance in the determined amount of time will result in variance in the defined sump fill time; and
(c) filling the sump by delivering water from the water source to the spray arm for the sump fill time determined in step (b) after the sump has been drained.

13. The method of claim 12 further comprising delivering water from the sump to the spray arm using a recirculating pump after the sump is filled in step (c).

14. The method of claim 13 further comprising preventing water from being delivered from the water source to the spray arm by closing an inlet valve while water is being delivered from the sump to the spray arm using the recirculating pump.

15. The method of claim 12 comprising knocking down foam by filling the sump with water delivered from above the sump.

16. A method of carrying out a self-cleaning operation in an oven that includes a cooking chamber for cooking food product, a sump positioned below the cooking chamber that collects water provided to the cooking chamber, a sensor positioned to detect when the sump is filled to a set fill level, an inlet valve configured to control supply of water to the cooking chamber, and a controller connected to control the inlet valve, the method involving the controller establishing a sump fill time for the self-cleaning operation as follows:
(a) the controller (i) opens the inlet valve, (ii) closes the inlet valve when the sensor indicates that the sump is filled to the set fill level, (iii) determines a duration of time between opening of the inlet valve in step (a)(i) and closing of the inlet valve in step (a)(ii) and (iv) determines the sump fill time as a function of the duration of time determined in step (a)(iii) such that variance in the duration of time determined in step (a)(iii) results in variance in the sump fill time, and
(b) during a phase of the self-cleaning operation the controller opens the inlet valve for the sump fill time regardless of an earlier indication by the sensor that the sump is filled to the set level, the phase occurring after the sump has been drained of water delivered in steps (a)(i) and (a)(ii).

* * * * *